July 1, 1924.
O. W. HEISE ET AL
1,499,657
PRESSURE GAUGE
Filed Nov. 21. 1921
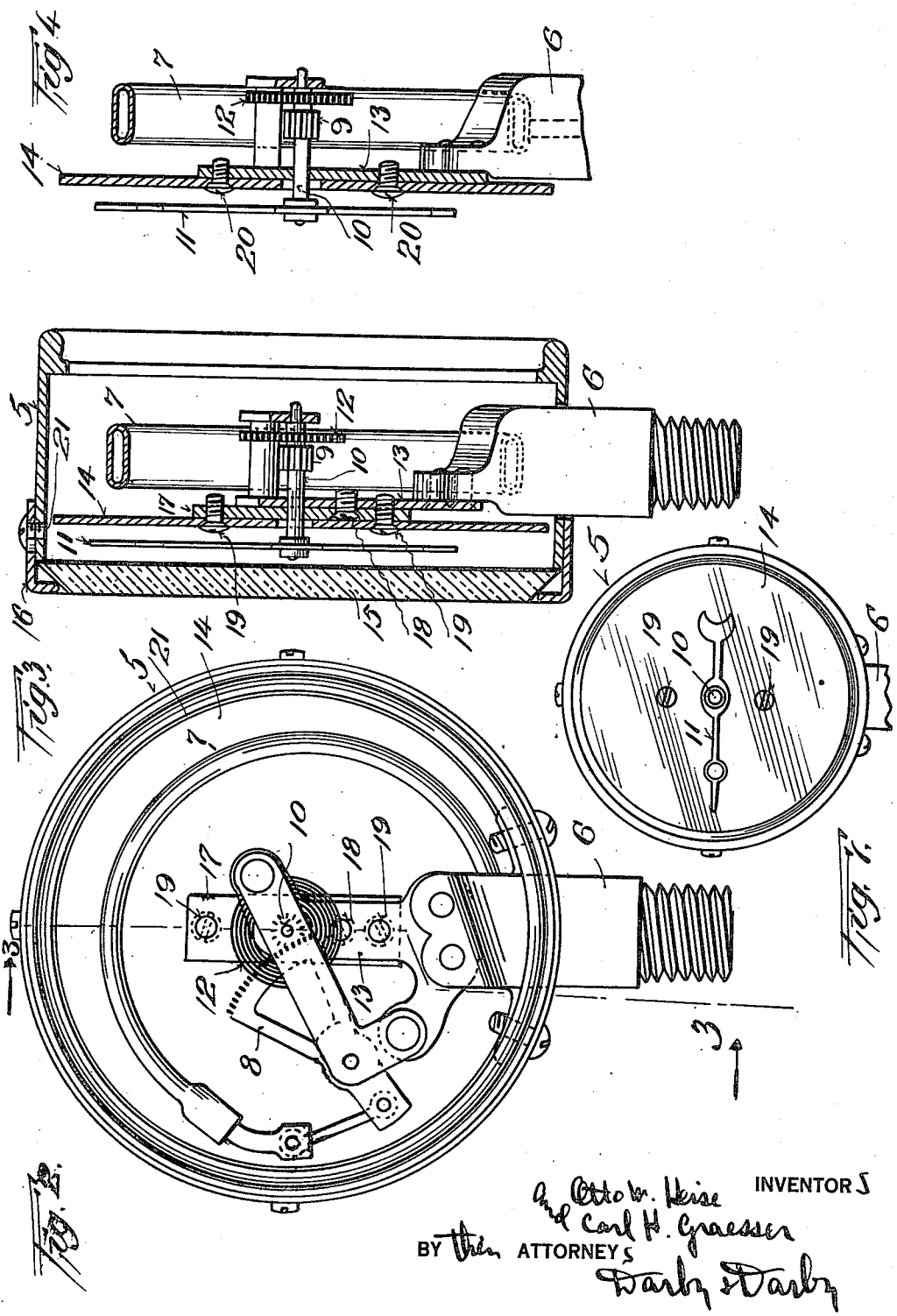
INVENTORS
Otto W. Heise
Carl H. Graesser
BY their ATTORNEYS
Darby & Darby Patented July 1, 1924.

1,499,657

UNITED STATES PATENT OFFICE.

OTTO W. HEISE AND CARL H. GRAESSER, OF BRIDGEPORT, CONNECTICUT, ASSIGNORS TO MANNING, MAXWELL & MOORE, INC., OF NEW YORK, N. Y., A CORPORATION OF NEW JERSEY.

PRESSURE GAUGE.

Application filed November 21, 1921. Serial No. 516,525.

*To all whom it may concern:*

Be it known that we, OTTO W. HEISE and CARL H. GRAESSER, both citizens of the United States, and residents, respectively, of Bridgeport, county of Fairfield, State of Connecticut, have made a certain new and useful Invention in Pressure Gauges, of which the following is a specification.

This invention relates to pressure gauges. The object of the invention is to provide a pressure gauge which is simple in structure and efficient in operation, and wherein means are provided for preventing injury to the glass cover plate employed in connection with devices of this nature in case of an explosion occurring within the instrument case.

A further object of the invention is to provide means for mounting and securing the dial plate which separates the pressure responsive element of the device and movement which actuates the dial hand or pointer from the glass cover plate which is efficiently mounted, held and retained with relation to the movement supporting frame in such manner as to protect the front glass plate of the case against injury or breakage due to explosions within the case of the instrument or rupture of the sensitive element of the instrument.

Other objects of the invention will appear more fully hereinafter.

The invention consists substantially in the construction, combination, location, and relative arrangement of parts, all as will be more fully hereinafter set forth, as shown in the accompanying drawing, and finally pointed out in the appended claims.

Referring to the accompanying drawing:—

Fig. 1 is a view in face elevation of a pressure gauge constructed in accordance with the principles of our invention, the transparent cover plate being removed.

Fig. 2 is a view in rear elevation on a somewhat larger scale, the closure for the open end of the casing being removed to disclose the pressure responsive element and the movement.

Fig. 3 is a view in section on the line 3, 3, Fig. 2, looking in the direction of the arrows.

Fig. 4 is a view similar to Fig. 3 showing a slightly modified arrangement embraced within the spirit and scope of our invention.

The same part is designated by the same reference numeral wherever it occurs throughout the several views.

In the use of pressure gauges, and particularly where such gauges are employed with tanks containing gases of various kinds maintained under high pressure, as, for illustration, oxygen tanks, explosions sometimes occur within the gauge case due to various causes, such, for example, as rupture of the Bourdon tube, or other form of pressure sensitive element of the gauge, or leakage of gas into the case, where, through carelessness, or otherwise, oil, has been permitted to get into the apparatus. The explosions resulting from such and other causes take place so instantaneously and create such sudden and high pressures inside the gauge case, that the dial plate and its transparent cover plate are liable to be shattered or blown out of the case, and not only injure or destroy the apparatus, but are also liable to injure attendants or others who may happen to be in the vicinity. Particularly is this true where, as has been frequently the case, the dial plate is supported at its peripheral edge upon a shoulder formed in the case of the instrument and is fastened thereto, with a fairly tight fit within the interior wall of the case. In such an instance when an explosion takes place within the case of the instrument the force of the explosion instead of being distributed throughout the area of the dial plate concentrates at the region of the center of the dial plate, which is the least resistant area thereof, with the result that the dial plate buckles or bulges at its center and strikes the transparent cover plate at approximately the center thereof, and hence at a point where it is least able to resist the impact, and consequently when the explosion occurs the very dangerous and objectionable liability is incurred of shattering the transparent face plate, which frequently is of glass.

It is among the special purposes of our present invention to provide a structure, arrangement and mounting for the dial plate which will retain the central region of the plate anchored to the movement frame, leaving the peripheral portion of the dial plate free, so that in case of an explosion occurring within the instrument case any bending or deflection of the dial plate will take place in the region of its peripheral portion, in which case if the edge of the dial plate is carried into contact with the transparent cover plate, will do so adjacent the peripheral edge portion of the cover plate and hence in a region of the cover plate which is held and retained in position, and is capable of resisting the impact. We also propose to mount the dial plate with its peripheral edge substantially free from contact with the inner wall surface of the instrument case, thereby not only permitting the pressure resulting from an explosion within the instrument case to be distributed radially throughout the area of the dial plate, but also permitting such pressure to escape around the edges of the dial plate and to expand into the space between the dial plate and the cover plate, thereby decreasing, to some extent at least, the rupturing action of such pressure upon the cover plate.

In carrying out our invention the dial plate may be anchored or fastened in any suitable or convenient manner in the region of its central portion either directly to the frame which carries the gauge movement or else to an auxiliary plate, which in turn is fastened to such frame.

In the drawing 5 designates the casing of the instrument, which, in the form shown for illustration, is cylindrical in shape and open at both ends. Extending through the wall of the cylindrical casing 5 is the socket member 6, which may be of the usual or any well known structure and suitably secured to the case. The pressure responsive element 7 is shown in the form of the usual Bourdon tube which is anchored at one end to and in communication with the passage through the socket 6 in the usual and well known manner. The free end of the Bourdon tube is suitably connected in any convenient way to the segment 8 which meshes with a pinion 9 on the spindle 10 of the dial hand or pointer 11. The usual spring 12 serves to normally retain the dial hand or pointer in its initial or zero position. The segment 8 and dial spindle 10 are mounted in a frame work 13 which is carried by the socket member 6. The dial spindle 10 extends through a central opening in the dial plate 14 and into the space between the dial plate 14 and the transparent cover plate 15, the latter being held in place against one end of the casing 5 in any suitable or convenient manner, as, for instance, by means of the collar 16, see Fig. 3, which engages over the peripheral edge of the cover plate.

In accordance with the principles of our invention, we propose to anchor the central region or portion of the dial plate to the frame which carries the movement. In the arrangement shown in Figs. 2 and 3, a plate 17 is fastened to the member 13 of the movement frame by means of the fastening screw 18, and to the plate 17 the dial plate 14 is fastened by means of the fastening screws 19, the latter passing through the dial plate and being tapped into the threaded openings in the plate 17. If desired, one or both of the fastening screws 19 may also be utilized, where convenient, for securing the plate 17 to the frame member 13.

In the arrangement shown in Fig. 4 the dial plate 14 is fastened directly to the member 13 of the movement supporting frame by means of the fastening screws 20, and without the interposition of the auxiliary plate 17. In fact the auxiliary plate 17 is employed merely for the purpose of enabling us to apply our invention to standard forms of movement supporting frames at present in use without modification of such frame structures by extensions or projections, but it is to be understood that our invention contemplates the fastening of the dial plate to the movement frame, whether directly as shown in Fig. 4, or, when required, by the interposition of a fastening plate 17, as shown in Fig. 3.

It will be observed that the fastening screws 19 (Fig. 3), 20 (Fig. 4), are disposed at diametrically opposite points with relation to the dial plate and at respectively opposite points with reference to the center of the dial plate.

This construction for mounting dial plates secures the advantage above noted of an anchorage for the dial plate at the region of its center, leaving the peripheral portion or area of the dial plate free from anchorage, and consequently, when an explosion takes place within the instrument case the resulting pressure instead of concentrating at the center, and hence the least resistant area of the dial plate, will become distributed radially over the entire face of the dial plate, and any resultant bending or buckling of the dial plate will result merely in bending out the edge portion of the dial plate, in which event, should the edge portion be carried by the force of the pressure into contact with the transparent cover plate 15, such point of contact will be at the peripheral edge of the latter where such cover plate is supported by the retaining collar 16 upon the end of the gauge case, and hence at a point where the cover plate is afforded its greatest resistance to rupture.

The structure for mounting the dial plate above described renders it unnecessary to anchor or secure the peripheral edge of the dial plate, and, therefore, in accordance with our invention, we propose to provide a clearance indicated at 21, see Fig. 3, between the peripheral edge surface of the dial plate and the inner wall surface of the gauge case. The provision of this area or space permits the gases developed within the case resulting from an explosion therein, after being distributed radially over the inner surface of the dial plate, to escape through the area 21, and into the space between the dial plate 14 and the cover plate 15. This not only retards the travel of the gases due to the explosion but also absorbs the pressure developed thereby, and, in addition, permits such gases to expand into the area or space between the dial plate and the cover plate, and hence to be materially reduced in power by the time such gases reach the cover plate. This diminution of the power of the pressure exerted by the gases permits the cover plate to efficiently resist the action thereof. Moreover, the gases escaping from the interior of the instrument case into the space between the dial plate and the cover plate first impinge upon the edge portion of the cover plate where such cover plate is held by the collar 16, and hence at a point where the cover plate is best able to resist the action of the expanding gases.

A structure embodying the principles of our invention, while suitable for use in various types and forms of gauges having a casing which is open to permit the release of pressure in the interior thereof and is illustrated in connection with such a casing which is open at the back. It is particularly useful in connection with pressure gauges employing an open casing having an easily releasable cover to close the end of the case remote from that end at which the transparent cover plate is applied, as, for instance, the form of gauge set forth, described and claimed in application of Crocker and Heise, Serial No. 304,074, filed June 13, 1919. But we do not deem it necessary in the present application to show the feature of the easily releasable cover as our present invention relates more particularly to the mounting of the dial plate.

While we have described specific structures embodying the principles of our invention, it is to be understood that many variations and changes in the details thereof will readily occur to persons skilled in the art and still fall within the spirit and scope of our invention. We do not desire therefore to be limited or restricted to the exact details shown and described, but having now set forth the objects and nature of our invention and structures embodying the principles thereof, what we claim as new and useful and of our joint invention, and desire to secure by Letters Patent is,—

1. A pressure gauge comprising a cylindrical casing, a transparent cover plate secured to the front end of the casing, the rear end of the casing being arranged to permit free relief of abnormal pressure generated within the casing, a movement supporting frame within the casing, and a dial plate secured at its central portion to the frame and having its peripheral portions free and spaced from the inner wall of the casing.

2. A pressure gauge comprising a cylindrical casing open at its rear end to permit relief of abnormal pressure therein, a transparent cover plate secured to the front end of the casing, a movement supporting frame within the casing, a backing plate disposed in front of the frame, a dial plate engaging the backing plate, said dial plate being spaced peripherally from the inner wall of the casing, and common means connecting the dial plate and backing plate to the frame.

In testimony whereof we have hereunto set our hands on this 17th day of Nov., A. D., 1921.

OTTO W. HEISE.
CARL H. GRAESSER.